(12) United States Patent
Nagata et al.

(10) Patent No.: US 6,645,889 B2
(45) Date of Patent: *Nov. 11, 2003

(54) GLASS COMPOSITION FOR CRYSTALLIZED GLASS

(75) Inventors: Hideki Nagata, Kobe (JP); Hiroshi Yuki, Shiga-ken (JP); Toshiharu Mori, Settsu (JP); Hideki Kawai, Nishinomiya (JP); Kazuhiko Ishimaru, Kaizuka (JP)

(73) Assignee: Minolta Co., Ltd., Osaka (JP)

( * ) Notice: Subject to any disclaimer, the term of this patent is extended or adjusted under 35 U.S.C. 154(b) by 85 days.

This patent is subject to a terminal disclaimer.

(21) Appl. No.: 09/822,288

(22) Filed: Apr. 2, 2001

(65) Prior Publication Data

US 2001/0051580 A1 Dec. 13, 2001

(30) Foreign Application Priority Data

Apr. 3, 2000 (JP) ......................... 2000-100820

(51) Int. Cl.$^7$ .................. C03C 10/04; G11B 5/82
(52) U.S. Cl. ................. 501/5; 501/9; 501/10; 65/33.1; 428/694 ST
(58) Field of Search ............. 501/4, 5, 9, 10; 65/33.1; 428/694 ST, 694 SG

(56) References Cited

U.S. PATENT DOCUMENTS

| | | | |
|---|---|---|---|
| 4,042,362 A | 8/1977 | MacDowell et al. | |
| 4,304,603 A | 12/1981 | Grossman et al. | |
| 4,374,931 A | 2/1983 | Courbin et al. | |
| 4,714,687 A | 12/1987 | Holleran et al. | |
| 5,219,799 A | 6/1993 | Beall et al. | |
| 5,352,638 A | 10/1994 | Beall et al. | |
| 5,391,522 A | 2/1995 | Goto et al. | |
| 5,476,821 A | 12/1995 | Beall et al. | |
| 5,489,558 A | 2/1996 | Moffatt et al. | |
| 5,491,116 A | 2/1996 | Beall et al. | |
| 5,532,194 A * | 7/1996 | Kawashima et al. | 501/9 |
| 5,567,217 A | 10/1996 | Goto et al. | |
| 5,580,363 A | 12/1996 | Goto et al. | |
| 5,626,935 A | 5/1997 | Goto et al. | |
| 5,676,721 A | 10/1997 | Fredholm et al. | |
| 5,726,108 A | 3/1998 | Taguchi et al. | |
| 5,786,286 A | 7/1998 | Kohli | |
| 5,866,489 A | 2/1999 | Yamaguchi | |
| 5,872,069 A | 2/1999 | Abe | |
| 5,910,459 A | 6/1999 | Beall et al. | |
| 5,968,219 A | 10/1999 | Gille et al. | |
| 5,981,015 A * | 11/1999 | Zou et al. | 501/428 |
| 6,063,470 A * | 5/2000 | Zou et al. | 428/64.2 |
| 6,124,223 A * | 9/2000 | Beall et al. | 501/4 |
| 6,182,472 B1 | 2/2001 | Fredholm et al. | |
| 6,187,407 B1 * | 2/2001 | Zou et al. | 501/11 |
| 6,214,429 B1 * | 4/2001 | Zou et al. | 428/64.1 |
| 6,245,411 B1 * | 6/2001 | Goto et al. | 501/9 |
| 6,294,490 B1 * | 9/2001 | Zou et al. | 501/9 |
| 6,306,786 B1 * | 10/2001 | Koyama et al. | 501/69 |
| 6,332,338 B1 * | 12/2001 | Hashimoto et al. | 65/29.21 |
| 6,344,423 B2 * | 2/2002 | Goto et al. | 501/4 |
| 6,376,084 B1 * | 4/2002 | Kishimoto et al. | 501/5 |
| 6,376,402 B1 * | 4/2002 | Pannhorst et al. | 501/66 |
| 6,399,527 B1 * | 6/2002 | Kishimoto et al. | 501/69 |
| 6,429,160 B1 * | 8/2002 | Nakajima et al. | 501/5 |

FOREIGN PATENT DOCUMENTS

| | | |
|---|---|---|
| JP | 9-208260 | 8/1997 |
| JP | 9-314458 | 12/1997 |
| JP | 10-208226 | 8/1998 |
| JP | 10-226532 | 8/1998 |
| JP | 11-16142 | 1/1999 |
| JP | 11-16143 | 1/1999 |
| JP | 11-322362 | 11/1999 |

* cited by examiner

Primary Examiner—Karl Group
(74) Attorney, Agent, or Firm—Burns, Doane, Swecker & Mathis, LLP

(57) ABSTRACT

A polished glass disk medium substrate suitable for use as a substrate for a hard disk, a hard disk containing the substrate and methods for making the substrate. The substrate containing glass forming raw materials may be formed so as to have a Young's modulus of 110 or higher.

38 Claims, No Drawings

GLASS COMPOSITION FOR CRYSTALLIZED GLASS

RELATED APPLICATION

This application claims priority to Japanese Patent Application No. 2000-100820 filed in Japan on Apr. 3, 2000, the contents of which are hereby incorporated by reference.

1. Field of the Invention

The present invention relates to a glass composition, and specifically relates to a glass composition suited for crystallized glass. More specifically, the present invention relates to a composition for crystallized glass disk medium. Such disk medium include hard disks, magnetic disks, optical disks and magnetic-optical disks 2. Description of the Prior Art Aluminum and glass are known materials suitable for use as magnetic disk substrates. Among these substrates, glass substrates have been the focus of most attention due to their superior surface smoothness and mechanical strength. Such glass substrates include chemically reinforced glass substrates strengthened by ion exchange on the surface, and crystallized glass substrates having strengthened bonds by depositing a crystal component on the substrate.

The performance demands of recent substrates have become more severe day by day, and improved performance is particularly sought regarding strength, flex and warp during high-speed rotation. This type of performance can be expressed by the Young's modulus of the substrate material, in which a higher numerical value is desirable.

For example, the composition disclosed in Japanese Laid-Open Patent Application No. 11-322362 attains a Young's modulus value of 130 or greater. However, this prior art requires extremely high thermal processing temperatures which complicate the manufacturing process, that is, this art requires a primary processing temperature of 800° C., and a secondary processing temperature of 1,000° C.

SUMMARY OF THE INVENTION

An object of the present invention is to provide an improved glass composition.

Another object of the present invention is to provide a glass composition having a high Young's modulus and which is highly suited for mass production.

These objects are attained with a glass composition of the present invention desirably having the main components within the ranges described below:

about 35 wt % or more, but less than about 50 wt % $SiO_2$;

about 5 wt % or more, but less than about 30 wt % $Al_2O_3$;

about 10 wt % or more, but less than about 30 wt % MgO;

about 5 wt % or more, but less than about 20 wt % $TiO_2$; and about 0.1 wt % or more, but less than about 2.4 wt % $Li_2O$.

DESCRIPTION OF THE PREFERRED EMBODIMENT

The preferred embodiments of the present invention are described hereinafter.

These objects are attained with a glass composition of the present invention desirably having the main components within the ranges described below:

about 35 wt % or more, but less than about 50 wt % $SiO_2$;

about 5 wt % or more, but less than about 30 wt % $Al_2O_3$;

about 10 wt % or more, but less than about 320 wt % MgO;

about 5 wt % or more, but less than about 20 wt % $TiO_2$;

and about 0.1 wt % or more, but less than about 2.4 wt % $Li_2O$.

When the composition content of $SiO_2$ used as a glass forming oxide is less than about 35 wt %, melting characteristics are typically adversely affected, and when the percentage exceeds about 50 wt %, a stabilized state of glass is achieved and crystal deposition typically becomes difficult.

Aluminum oxide ($Al_2O_3$) is an intermediate oxide of glass, and is a structural component of the crystal-phase magnesium-aluminum crystals formed during heating. When the composition content is less than about 5 wt %, there are typically few crystals formed, and the desired strength is not obtained, whereas when the percentage exceeds about 30 wt %, the melting temperature is typically raised and devitrification readily occurs.

Magnesium oxide (MgO) is a fluxing agent, which is added to induce the crystal particles to nucleate and form crystal particle clusters. When the composition content is less than about 10 wt %, the working temperature range is typically narrowed, and the chemical durability of the glass matrix phase is not typically improved. When the composition content exceeds about 30 wt %, other crystal phase matter is often deposited and the desired strength is typically difficult to obtain.

Titanium oxide ($TiO_2$) is a crystal nucleating agent, which is often an essential component for magnesium silicate crystal deposition. Furthermore, $TiO_2$ functions as a fluxing agent to improve stability during production. When the composition content is less than about 5 wt %, melting characteristics are typically adversely affected, and crystal growth is often difficult. When the content exceeds about 20 wt %, crystallization typically progresses rapidly, the crystallization state often becomes difficult to control, the deposited crystals are typically coarse with heterogeneity of the crystal phase, and a fine homogeneous crystal structure often cannot be obtained, such that the required surface smoothness for use as a disk substrate is difficult to obtain by a polishing process. Furthermore, devitrification readily occurs during fusion molding, and mass production characteristics are reduced.

Stability during manufacture is improved by the addition of $Li_2O$, which functions as a fluxing agent. When the composition content is less than about 0.1 wt %, there is inadequate improvement in melting characteristics. When the composition content exceeds about 2.4 wt %, stability often decreases during the polishing and washing processes.

The manufacturing method is described below. The raw materials of the ultimately produced glass substrate are thoroughly mixed in specific proportions, then introduced to a platinum crucible and melted. After melting, the melted material is poured into a mold to form an approximate shape. Then the material is annealed to room temperature. Next, the material is maintained at a primary heating process temperature of about 500 to about 680° C. during a primary process (heating process) to generate crystal nuclei. Then, the material is maintained at a secondary heating process temperature of about 680 to about 800° C. during a secondary process to grow crystal nuclei. Then the material is cooled to obtain the crystallized glass.

This material may be used as a disk substrate by processing such as polishing to attain a desired shape and thickness.

By using the above raw materials and the process described herein, an extremely high Young's modulus and high mass production characteristics are obtainable. Even higher performance is obtained by adding the components described below in a suitable range.

Zinc oxide (ZnO) functions as a fluxing agent which augments uniform crystal deposition. When the composition content is less than about 0.1 wt %, there is typically insufficient improvement in crystal homogeneity. When the composition content exceeds about 22 wt %, the glass becomes stable, and crystallization is suppressed, such that the desired strength is often difficult to obtain.

Phosphoric anhydride ($P_2O_5$), which functions as a fluxing agent, is a nucleating agent for depositing silicate crystals, and is an important component for uniform deposition of crystals on the entirety of the glass. When the composition content is less than about 0.1 wt %, sufficient formation of crystal nuclei typically becomes difficult, crystal particles are often coarse, heterogeneous crystal deposition often occurs, the desired fine homogeneous crystal structure may be difficult to obtain, such that the required surface smoothness for use as a disk substrate may be difficult to obtain by a polishing process. When the content exceeds about 5.0 wt %, reactivity to the filter medium increases during melting, and devitrification increases so as to reduce mass production characteristics during fusion molding. Chemical durability typically decreases, there is concern that the magnetic layer may be affected, and stability is often reduced during the polishing and washing processes.

Adding $ZrO_2$ which functions as a glass modifying oxidant also functions effectively as a glass crystal nucleating agent. When the content ratio is less than about 0.1 wt %, sufficient formation of crystal nuclei typically becomes difficult, crystal particles are often coarse, heterogeneous crystal deposition often occurs, the desired fine homogeneous crystal structure may be difficult to obtain, such that the required surface smoothness for use as a disk substrate may be difficult to obtain by a polishing process. Furthermore, chemical durability and migration resistance are often reduced, there is concern that the magnetic layer may be affected, and stability is often reduced during the polishing and washing processes. When the content exceeds about 12 wt %, the melting temperature is raised, devitrification readily occurs, and fusion molding typically becomes difficult. Furthermore, the deposition crystal phase fluctuates such that desired characteristics are often difficult to obtain.

The addition of CaO, which functions as a fluxing agent, supplements uniform crystal deposition. When the composition content is less than about 0.1 wt %, sufficient improvement in crystal homogeneity is not typically obtained. When the content exceeds about 9 wt %, chemical durability is not typically improved.

Crystal nucleating material is increased by the addition of $Nb_2O_5$, which works as a fluxing agent. When the composition content is less than about 0.1 wt %, there is often inadequate rigidity improvement. When the composition content exceeds about 9 wt %, crystallization of the glass typically becomes unstable, the deposition crystal phase typically becomes uncontrollable, and the desired characteristics are often difficult to obtain.

The addition of $Ta_2O_5$, which works as a fluxing agent, improves fusion and strength, and also improves chemical durability in the glass matrix phase. When the composition content is less than about 0.1 wt %, there is typically inadequate rigidity improvement. When the composition content exceeds about 9 wt %, crystallization of the glass typically becomes unstable, the deposition crystal phase becomes uncontrollable, and the desired characteristics are often difficult to obtain.

Stability during manufacture is improved by the addition of $K_2O$, which functions as a fluxing agent. When the composition content is less than about 0.1 wt %, there is inadequate improvement in melting characteristics. When the composition content exceeds about 9 wt %, the glass typically becomes stable and crystallization is suppressed, chemical durability is often reduced, and there is concern that the magnetic layer will be affected, and stability often decreases during the polishing and washing processes.

Glass phase splitting is promoted by adding $B_2O_3$, which works as a former, and accelerates crystal deposition and growth. When the composition content is less than about 0.1 wt %, improvement of melting characteristics is typically inadequate. When the composition content exceeds about 9 wt %, glass devitrification readily occurs, molding typically becomes difficult, and the crystals often become coarse such that fine crystals is difficult to obtain.

Rigidity is improved by adding $Y_2O_3$, which functions as a fluxing agent. When the composition content is less than about 0.1 wt %, there is typically inadequate rigidity improvement. When the composition content exceeds about 9 wt %, crystal deposition is often suppressed, sufficient crystallization is difficult to obtain, and desired characteristics are often not attained.

Stability during mass production is improved by adding $Sb_2O_3$, which functions as a clarifier. When the composition content is less than about 0.1 wt %, there is typically insufficient clarification effect, and production characteristics are typically reduced. When the composition content exceeds about 9 wt %, crystallization of the glass often becomes unstable, the deposition crystal phase typically becomes uncontrollable, and the desired characteristics are often difficult to obtain.

Stability during production is improved by adding $As_2O_3$, which functions as a clarifier. When the composition content is less than about 0.1 wt %, there is often insufficient clarification effect, and production characteristics are often reduced. When the composition content exceeds about 9 wt %, crystallization of the glass typically becomes unstable, the deposition crystal phase typically becomes uncontrollable, and the desired characteristics are often difficult to obtain.

The glasses of the present invention may have one or more crystalline phases and an amorphous phase. The crystalline phases represent about 50 to about 60 percent of the total glass composition. Preferred embodiments include a main crystalline phase of clinoenstatite which desirably represents at least about 80 percent by weight of the total of all crystalline phases. Preferred embodiments may also include a secondary crystalline phase of, for example, enstatite magnesium aluminum silicate, and/or zinc titanium oxide which desirably represents less than about 20 percent by weight of the total crystalline phase.

Although the present invention is described in detail in the following examples, the invention is not limited to these examples. Tables 1–4 show the glass composition in percent-by-weight of Examples 1–36. Glass substrates were obtained by the previously described manufacturing method in accordance with these numerical examples.

In the tables, C1 represents a crystal phase of clinoenstatite ($MgSiO_3$), C2 represents a crystal phase of enstatite ($MgSiO_3$), M1 represents a crystal phase of magnesium aluminum silicate {$(Mg\ Al)SiO_3$}, Z1 represents a crystal phase of zinc titanium oxide ($Zn_2Ti_3O_8$) and Z2 represents a crystal phase of zinc titanium oxide ($Zn_2TiO_4$).

TABLE 1

|  | Ex. 01 | Ex. 02 | Ex. 03 | Ex. 04 | Ex. 05 | Ex. 06 | Ex. 07 | Ex. 08 | Ex. 09 | Ex. 10 |
| --- | --- | --- | --- | --- | --- | --- | --- | --- | --- | --- |
| $SiO_2$ | 48 | 48 | 45 | 45 | 45 | 45 | 45 | 40 | 40 | 40 |
| $Al_2O_3$ | 20 | 22 | 17 | 17 | 17 | 20 | 28 | 28 | 24 | 17 |
| MgO | 20 | 18 | 24 | 25 | 25 | 18 | 17.2 | 20 | 25 | 28 |
| $TiO_2$ | 11.9 | 11.8 | 13.5 | 12.2 | 12 | 15.5 | 8 | 10 | 8.8 | 12.6 |
| $Li_2O$ | 0.1 | 0.2 | 0.5 | 0.8 | 1 | 1.5 | 1.8 | 2 | 2.2 | 2.4 |
| Primary Treatment Temperature (° C.) | 660 | 660 | 660 | 660 | 660 | 660 | 660 | 660 | 660 | 660 |
| Secondary Treatment Temperature (° C.) | 700 | 700 | 700 | 700 | 700 | 700 | 700 | 700 | 700 | 700 |
| Primary Treatment Time (hr) | 5 | 5 | 5 | 5 | 5 | 5 | 5 | 5 | 5 | 5 |
| Secondary Treatment Temperature (hr) | 5 | 5 | 5 | 5 | 5 | 5 | 5 | 5 | 5 | 5 |
| Young's Modules (G Pa) | 148 | 145 | 151 | 148 | 150 | 152 | 135 | 141 | 138 | 154 |
| Diameter of Crystal (nm) | 30 | 30 | 30 | 30 | 30 | 30 | 30 | 30 | 30 | 30 |
| Main Crystal Phase | C1 | C1 | C1 | C1 | C1 | C1 | C1 | C1 | C1 | C1 |
| Secondary Crystal Phase | C2 | C2 | C2 | C2 | C2 | C2 | C2 | C2 | C2 | C2 |
| Other Crystal Phase | M1 | M1 | M1 | M1 | M1 | M1 | M1 | M1 | M1 | M1 |

TABLE 2

|  | Ex. 11 | Ex. 12 | Ex. 13 | Ex. 14 | Ex. 15 | Ex. 16 | Ex. 17 | Ex. 18 | Ex. 19 | Ex. 20 |
| --- | --- | --- | --- | --- | --- | --- | --- | --- | --- | --- |
| $SiO_2$ | 37 | 35 | 45 | 45 | 45 | 45 | 45 | 45 | 45 | 45 |
| $Al_2O_3$ | 17 | 20 | 17 | 20 | 17 | 20 | 17 | 20 | 17 | 20 |
| MgO | 25 | 15 | 25 | 18 | 25 | 18 | 25 | 18 | 25 | 18 |
| $TiO_2$ | 12 | 15.5 | 11.5 | 12.5 | 10 | 9.5 | 10 | 9.5 | 10 | 10.5 |
| $Li_2O$ | 1 | 1.5 | 1 | 1.5 | 1 | 1.5 | 1 | 1.5 | 1 | 1.5 |
| ZnO | 8.0 | 13.0 |  |  |  |  |  |  |  |  |
| $P_2O_5$ |  |  | 0.5 | 3.0 |  |  |  |  |  |  |
| $ZrO_2$ |  |  |  |  | 2.0 | 6.0 |  |  |  |  |
| CaO |  |  |  |  |  |  | 2.0 | 6.0 |  |  |
| Primary Treatment Temperature (° C.) | 660 | 660 | 660 | 660 | 660 | 660 | 660 | 660 | 660 | 660 |
| Secondary Treatment Temperature (° C.) | 700 | 700 | 700 | 700 | 700 | 700 | 700 | 700 | 700 | 700 |
| Primary Treatment Time (hr) | 5 | 5 | 5 | 5 | 5 | 5 | 5 | 5 | 5 | 5 |
| Secondary Treatment Temperature (hr) | 5 | 5 | 5 | 5 | 5 | 5 | 5 | 5 | 5 | 5 |
| Young's Modules (G Pa) | 149 | 141 | 148 | 147 | 146 | 140 | 147 | 153 | 155 | 149 |
| Diameter of Crystal (nm) | 30 | 30 | 30 | 30 | 30 | 30 | 30 | 30 | 30 | 30 |
| Main Crystal Phase | C1 | C1 | C1 | C1 | C1 | C1 | C1 | C1 | C1 | C1 |
| Secondary Crystal Phase | C2 | C2 | C2 | C2 | C2 | C2 | C2 | C2 | C2 | C2 |
| Other Crystal Phase | M1 | M1 | M1 | M1 | M1 | M1 | M1 | M1 | M1 | M1 |
| Other Crystal Phase | Z1 | Z1 |  |  |  |  |  |  |  |  |
| Other Crystal Phase | Z2 | Z2 |  |  |  |  |  |  |  |  |

TABLE 3

|  | Ex. 21 | Ex. 22 | Ex. 23 | Ex. 24 | Ex. 25 | Ex. 26 | Ex. 27 | Ex. 28 | Ex. 29 | Ex. 30 |
| --- | --- | --- | --- | --- | --- | --- | --- | --- | --- | --- |
| $SiO_2$ | 45 | 40 | 45 | 41 | 43 | 39 | 45 | 45 | 45 | 45 |
| $Al_2O_3$ | 17 | 20 | 17 | 20 | 17 | 20 | 15 | 16 | 16.8 | 19.5 |
| MgO | 25 | 18 | 25 | 18 | 25 | 18 | 25 | 18 | 25 | 18 |
| TiO | 10 | 15.5 | 11.8 | 15.5 | 12 | 15.5 | 12 | 15.5 | 12 | 15.5 |
| $Li_2O$ | 1 | 1.5 | 1 | 1.5 | 1 | 1.5 | 1 | 1.5 | 1 | 1.5 |
| $Ta_2O_5$ | 2.0 | 5.0 |  |  |  |  |  |  |  |  |
| $K_2O$ |  |  | 0.2 | 4.0 |  |  |  |  |  |  |
| $B_2O_3$ |  |  |  |  | 2.0 | 6.0 |  |  |  |  |
| $Y_2O_3$ |  |  |  |  |  |  | 2.0 | 4.0 |  |  |
| $Sb_2O_3$ |  |  |  |  |  |  |  |  | 0.2 | 0.5 |
| Primary Treatment Temperature (° C.) | 660 | 660 | 660 | 660 | 660 | 660 | 660 | 660 | 660 | 660 |
| Secondary Treatment Temperature (° C.) | 700 | 700 | 700 | 700 | 700 | 700 | 700 | 700 | 700 | 700 |
| Primary Treatment Time (hr) | 5 | 5 | 5 | 5 | 5 | 5 | 5 | 5 | 5 | 5 |
| Secondary Treatment Temperature (hr) | 5 | 5 | 5 | 5 | 5 | 5 | 5 | 5 | 5 | 5 |
| Young's Modules (G Pa) | 152 | 147 | 153 | 151 | 154 | 151 | 154 | 150 | 155 | 148 |
| Diameter of Crystal (nm) | 30 | 30 | 30 | 30 | 30 | 30 | 30 | 30 | 30 | 30 |
| Main Crystal Phase | C1 | C1 | C1 | C1 | C1 | C1 | C1 | C1 | C1 | C1 |
| Secondary Crystal Phase | C2 | C2 | C2 | C2 | C2 | C2 | C2 | C2 | C2 | C2 |
| Other Crystal Phase | M1 | M1 | M1 | M1 | M1 | M1 | M1 | M1 | M1 | M1 |
| Other Crystal Phase | Z1 | Z1 | Z1 | Z1 | Z1 | Z1 | Z1 | Z1 | Z1 | Z1 |
| Other Crystal Phase | Z2 | Z2 | Z2 | Z2 | Z2 | Z2 | Z2 | Z2 | Z2 | Z2 |

TABLE 4

|  | Ex. 31 | Ex. 32 | Ex. 33 | Ex. 34 | Ex. 35 | Ex. 36 |
|---|---|---|---|---|---|---|
| $SiO_2$ | 45 | 45 | 45 | 45 | 45 | 45 |
| $Al_2O_3$ | 15 | 20 | 12 | 20 | 15 | 15 |
| MgO | 25 | 14 | 25 | 10 | 25 | 18 |
| $TiO_2$ | 12 | 15.5 | 12 | 15.5 | 12 | 15.5 |
| $Li_2O$ | 1 | 1.5 | 1 | 1.5 | 1 | 1.5 |
| $Sb_2O_3$ | 2.0 | 4.0 | 5.0 | 8.0 | | |
| $As_2O_3$ | | | | | 2.0 | 5.0 |
| Primary Treatment Temperature (° C.) | 660 | 660 | 660 | 660 | 660 | 660 |
| Secondary Treatment Temperature (° C.) | 700 | 700 | 700 | 700 | 700 | 700 |
| Primary Treatment Time (hr) | 5 | 5 | 5 | 5 | 5 | 5 |
| Secondary Treatment Temperature (hr) | 5 | 5 | 5 | 5 | 5 | 5 |
| Young's Modules (G Pa) | 155 | 142 | 155 | 148 | 154 | 146 |
| Diameter of Crystal (nm) | 30 | 30 | 30 | 30 | 30 | 30 |
| Main Crystal Phase | C1 | C1 | C1 | C1 | C1 | C1 |
| Secondary Crystal Phase | C2 | C2 | C2 | C2 | C2 | C2 |
| Other Crystal Phase | M1 | M1 | M1 | M1 | M1 | M1 |

The present invention provides a glass substrate having excellent production characteristics and a Young's modulus of 110 or higher.

Although the present invention has been fully described by way of examples with reference to the accompanying drawings, it is to be noted that various changes and modification will be apparent to those skilled in the art. Therefore, unless such changes and modifications depart from the scope of the present invention, they should be construed as being included therein.

What is claimed is:

1. A polished glass ceramic disk medium substrate comprising crystalline and amorphous phases formed of a mixture of glass forming raw materials comprising
about 35% to about 50% by weight of $SiO_2$;
about 5% to about 30% by weight of $Al_2O_3$;
about 10% to about 30% by weight of MgO;
about 8% to about 20% by weight of $TiO_2$; and
about 0.1% to about 2.4% by weight of $Li_2O$;
wherein said glass disk medium substrate includes one or more crystalline phases selected from clinoenstatite, magnesium aluminum silicate, $Zn_2Ti_3O_8$, $Zn_2TiO_4$, or a main crystalline phase of clinoenstatite and a secondary crystalline phase of enstatite.

2. The polished glass ceramic disk medium substrate according to claim 1, wherein the raw materials further comprise about 0.1% to about 22% by weight ZnO.

3. The polished glass ceramic disk medium substrate according to claim 1, wherein the raw materials further comprise about 0.1% to about 5% by weight $P_2O_5$.

4. The polished glass ceramic disk medium substrate according to claim 1, wherein the raw materials further comprise about 0.1% to about 12% by weight $ZrO_2$.

5. The polished glass ceramic disk medium substrate according to claim 1, wherein the raw materials further comprise about 0.1% to about 9% by weight CaO.

6. The polished glass ceramic disk medium substrate according to claim 1, wherein the raw materials further comprise about 0.1% to about 9% by weight $Nb_2O_5$.

7. The polished glass ceramic disk medium substrate according to claim 1, wherein the raw materials further comprise about 0.1% to about 9% by weight $Ta_2O_5$.

8. The polished glass ceramic disk medium substrate according to claim 1, wherein the raw materials further comprise about 0.1% to about 9% by weight $K_2O$.

9. The polished glass ceramic disk medium substrate according to claim 1, wherein the raw materials further comprise about 0.1% to about 9% by weight $B_2O_3$.

10. The polished glass ceramic disk medium substrate according to claim 1, wherein the raw materials further comprise about 0.1% to about 9% by weight $Y_2O_3$.

11. The polished glass ceramic disk medium substrate according to claim 1, wherein the raw materials further comprise about 0.1% to about 9% by weight $Sb_2O_3$.

12. The polished glass ceramic disk medium substrate according to claim 1, wherein the raw materials further comprise about 0.1% to about 9% by weight $As_2O_3$.

13. The polished glass ceramic disk medium substrate according to claim 1, said raw materials consisting essentially of
about 35% to about 50% by weight $SiO_2$;
about 5% to about 30% by weight $Al_2O_3$;
about 10% to about 30% by weight MgO;
about 5% to about 20% by weight $TiO_2$;and
about 0.1% to about 2.4% by weight $Li_2O$.

14. The polished glass ceramic disk medium substrate according to claim 13, further containing one or more of the following:
about 0.1% to about 22% by weight ZnO;
about 0.1% to about 5% by weight $P_2O_5$;
about 0.1% to about 12% by weight $ZrO_2$;
about 0.1% to about 9% by weight CaO;
about 0.1% to about 9% by weight $Nb_2O_5$;
about 0.1% to about 9% by weight $Ta_2O_5$;
about 0.1% to about 9% by weight $K_2O$;
about 0.1% to about 9% by weight $B_2O_3$;
about 0.1% to about 9% by weight $Y_2O_3$;
about 0.1% to about 9% by weight $Sb_2O_3$; and
about 0.1% to about 9% by weight $As_2O_3$.

15. The polished glass ceramic disk medium substrate according to claim 13, wherein said substrate is essentially free of BaO, $ZrO_2$, $B_2O_3$ and NiO.

16. The polished glass ceramic disk medium substrate according to claim 1, wherein the crystalline phases represent about 50 to about 60 percent by weight of the total glass composition.

17. The polished glass ceramic disk medium substrate according to claim 1, comprising a crystalline phase of clinoenstatite.

18. The polished glass ceramic disk medium substrate according to claim 17, wherein the crystalline phase of clinoenstatite represents at least about 80 percent by weight of the crystalline phases.

19. The polished glass ceramic disk medium substrate according to claim 1, comprising a crystalline phase of enstatite.

20. The polished glass ceramic disk medium substrate according to claim 19, wherein the crystalline phase of enstatite represents less than or equal to about 20 percent by weight of the crystalline phases.

21. The polished glass ceramic disk medium substrate according to claim 1, comprising a crystalline phase of magnesium aluminum silicate.

22. The polished glass ceramic disk medium substrate according to claim 21, wherein the crystalline phase of magnesium aluminum silicate represents less than or equal to about 20 percent by weight of the crystalline phases.

23. The polished glass ceramic disk medium substrate according to claim 1, comprising a crystalline phase of $Zn_2Ti_3O_8$.

24. The polished glass ceramic disk medium substrate according to claim 23, wherein the crystalline phase of $Zn_2Ti_3O_8$ represents less than or equal to about 20 percent by weight of the crystalline phases.

25. The polished glass ceramic disk medium substrate according to claim 1, comprising a crystalline phase of $Zn_2TiO_4$.

26. The polished glass ceramic disk medium substrate according to claim 25, wherein the crystalline phase of $Zn_2TiO_4$ represents less than or equal to about 20 percent by weight of the crystalline phase.

27. The polished glass ceramic disk medium substrate according to claim 1, comprising a main crystalline phase of clinoenstatite and a secondary crystalline phase of enstatite.

28. The polished glass ceramic disk medium substrate according to claim 27, further comprising one or more of a crystalline phase of magnesium aluminum silicate, a crystalline phase of $Zn_2Ti_3O_8$ and crystalline phase of $Zn_2TiO_4$.

29. The polished glass ceramic disk medium substrate according to claim 1, wherein said glass disk medium substrate has a Young's modulus of 110 GPa or higher.

30. The polished glass ceramic disk medium substrate according to claim 1, wherein said substrate is prepared by heating glass forming raw materials to a temperature, $T_1$, between about 500 and 680° C. to generate crystal nuclei; heating at a temperature, $T_2$, between about 680 and abot 800° C. to grow crystal nuclei; and cooling to obtain crystallized glass.

31. A recording disk comprising the polished glass ceramic disk medium substrate defined in claim 1.

32. The recording disk according to claim 31, wherein said recording disk is a hard disk.

33. The recording disk according to claim 31, wherein said recording disk is a magnetic disk.

34. The recording disk according to claim 31, wherein said recording disk is an optical disk.

35. The recording disk according to claim 31, wherein said recording disk is a magnetic-optical disk.

36. A method of making a glass ceramic disk medium substrate comprising:

heating glass forming raw materials to a temperature sufficiently high to melt the raw materials;

forming a disk medium substrate; and crystallizing the disk medium substrate, wherein said crystallizing comprises heating the disk medium substrate to a temperature, $T_1$, between about 500 and 680° C. to generate crystal nuclei; heating at a temperature, $T_2$, between about 680 and about 800° C to grow crystal nuclei; and cooling to obtain crystallized glass;

wherein said glass disk medium substrate is formed of a mixture of glass forming raw materials comprising, about 35% to about 50% by weight of $SiO_2$;

about 5% to about 30% by weight of $Al_2O_3$, about 10% to about 30% by weight of MgO;

about 8% to about 20% by weight of $TiO_2$; and about 0.1% to about 2.4% by weight of $Li_2O$.

37. The method according to claim 36, further comprising polishing said glass ceramic disk medium substrate.

38. The method according to claim 36, wherein said glass ceramic disk medium substrate has a Young's modulus of 110 GPa or higher.

* * * * *